(12) United States Patent
Xu

(10) Patent No.: US 10,159,266 B2
(45) Date of Patent: Dec. 25, 2018

(54) EDIBLE PET CHEW OF ARTIFICIAL BULLY STICK

(71) Applicant: SHANGHAI SUNLIGHT ELECTRONIC WEIGHTING APPARATUS CO. LTD., Shanghai (CN)

(72) Inventor: Guangqiang Xu, Shanghai (CN)

(73) Assignee: Shanghai Sunlight Electronic Weighting Apparatus Co., Ltd., Shanghai (CN)

( * ) Notice: Subject to any disclaimer, the term of this patent is extended or adjusted under 35 U.S.C. 154(b) by 0 days.

(21) Appl. No.: 15/680,721

(22) Filed: Aug. 18, 2017

(65) Prior Publication Data

US 2017/0339981 A1 Nov. 30, 2017

Related U.S. Application Data

(63) Continuation-in-part of application No. 14/059,420, filed on Oct. 21, 2013, now Pat. No. 9,770,044, which is a continuation-in-part of application No. 13/052,113, filed on Mar. 21, 2011, now Pat. No. 8,776,728.

(51) Int. Cl.
| | |
|---|---|
| *A01K 29/00* | (2006.01) |
| *A23K 40/25* | (2016.01) |
| *A01K 15/02* | (2006.01) |
| *A23K 10/30* | (2016.01) |
| *A23K 10/20* | (2016.01) |
| *A23K 10/26* | (2016.01) |
| *A23K 40/30* | (2016.01) |
| *A23K 50/42* | (2016.01) |

(52) U.S. Cl.
CPC ............ *A23K 40/25* (2016.05); *A01K 15/026* (2013.01); *A23K 10/20* (2016.05); *A23K 10/26* (2016.05); *A23K 10/30* (2016.05); *A23K 40/30* (2016.05); *A23K 50/42* (2016.05)

(58) Field of Classification Search
CPC .... A01K 15/026; A23N 17/005; A23K 40/25; A23K 10/20; A23K 10/26; A23K 10/30; A23K 50/40; A23K 50/42
See application file for complete search history.

(56) References Cited

U.S. PATENT DOCUMENTS

| | | | |
|---|---|---|---|
| 6,895,900 B2 * | 5/2005 | Hingst | A01K 15/026 119/710 |
| 7,677,203 B2 | 3/2010 | Stern | |
| 8,074,609 B2 * | 12/2011 | Adkins | A01K 15/026 119/707 |
| 8,479,687 B2 * | 7/2013 | Anderson | A01K 15/026 119/709 |

(Continued)

*Primary Examiner* — Trinh T Nguyen
(74) *Attorney, Agent, or Firm* — Raymond Y. Chan; David and Raymond Patent Firm

(57) ABSTRACT

An edible pet chew comprises a member of Artificial Bully Stick formed from a composition material with pizzle ingredient imitating existing traditional bully stick products, serving as an alternative to traditional bully stick. The imitation may include the structure, and/or appearance, and/or size, and/or color, and/or texture, and/or flavor, and/or durability, and/or palatability of traditional bully stick. Preferably it is an extruded stick processed by an extruder.

13 Claims, 10 Drawing Sheets

(56) References Cited

U.S. PATENT DOCUMENTS

| | | | |
|---|---|---|---|
| 2005/0266146 A1* | 12/2005 | Shu | A23K 10/20 |
| | | | 426/641 |
| 2007/0193531 A1* | 8/2007 | Anderson | A01K 15/026 |
| | | | 119/709 |
| 2007/0289552 A1* | 12/2007 | Axelrod | A01K 15/026 |
| | | | 119/710 |
| 2008/0118606 A1* | 5/2008 | Stern | A23N 17/005 |
| | | | 426/92 |
| 2011/0139087 A1* | 6/2011 | Lang | A23K 40/20 |
| | | | 119/709 |
| 2011/0232582 A1* | 9/2011 | Adkins | A01K 15/026 |
| | | | 119/710 |
| 2012/0079992 A1 | 4/2012 | Chen et al. | |
| 2014/0044838 A1* | 2/2014 | Xu | A23K 1/1846 |
| | | | 426/92 |
| 2014/0363537 A1* | 12/2014 | Doerr | A23K 1/1653 |
| | | | 426/63 |
| 2015/0181839 A1* | 7/2015 | Baikie | A01K 15/026 |
| | | | 119/710 |
| 2017/0181449 A1* | 6/2017 | Harbour | A23K 40/30 |

* cited by examiner

EDIBLE PET CHEW OF ARTIFICIAL BULLY STICK

CROSS REFERENCE OF RELATED APPLICATION

This is a continuation in part application that claims the benefit of priority under 35 U.S.C. § 119 to co-pending U.S. patent application Ser. No. 14/059,420, filed on Oct. 21, 2013, which is a continuation in part of U.S. patent application Ser. No. 13/052,113, filed Mar. 21, 2011, now U.S. Pat. No. 8,776,728. This application is also related to a non-provisional application, U.S. patent application Ser. No. 14/289,610, filed on May 28, 2014, now U.S. Pat. No. 9,044,039, which is a continuation in part of U.S. application Ser. No. 13/052,113, filed on Mar. 21, 2011. This application is also related to U.S. application Ser. No. 13/052,113, filed on Mar. 21, 2011.

This application claims the priority to China Patent Application Serial No. 201710697772.9, filed on Aug. 15, 2017.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The field of this invention relates to an Edible Pet Chew.

Description of Related Arts

Domestic pets, primarily dogs, have an instinct to chew which keeps their teeth healthy, exercises their jaws and teeth and keeps teeth clean. "Pet Chew" products have been introduced to the market for many years to accommodate that instinctive urge to chew in a healthy direction.

"Pet Chews" are intended to be chewed by a pet/dog for an extended period of time before being digested. A great part of pet chew products in the market are traditional Bully Sticks welcome very much by dogs and consumers, which are made of natural bovine penis. Generally foreskin of bovine penis is removed, cleaned and then dehydrated by for example heating or freeze-drying. It enjoys an inherent "good palatability" and "durability (after dehydrating process)" which makes it an outstanding successful product in the trade.

However, traditional bully stick products have some drawbacks, such as: 1. extremely high price per gram. Due to the natural scarcity property with the source of natural bovine pizzle, raw materials (bovine pizzle) for producing traditional bully sticks are sold at an extremely high price, which creates the final products, traditional bully sticks, being sold to consumers at an extremely high price. 2. Materially hard to acquisition due to natural scarcity property with the source of natural bovine pizzle.

In the market, there's another popular products in a form of extruded stick, typically formulated by plant based materials, enjoying a low cost materials. Also, it is a product with "durability" property which can provide a long chewing time for dogs. However these kind of products are sold by many distributors/retailers under a great competition. The competition is a homogeneous one, in which a product is hard to be well distinguished from another. A homogeneity product is hard to attract consumers to buy.

What is required is to provide a pet chew overcoming the drawbacks above-mentioned accompanying the existing traditional bully stick product and extruded stick products.

U.S. patent application Ser. No. 13/858,592 by Shrestha, filed on Apr. 8, 2013, disclosed a pet chew comprising a hardened cheese and a dry animal tissue such as bully sticks attached to the cheese piece. And it also disclosed a kind of animal tissue puff such as bully puff. However, the bully sticks or bully puff it attempted to apply as still is traditional bully sticks, no new matters. It still has the drawbacks of traditionally bully stick as aforementioned.

U.S. Pat. No. 8,479,687 by Anderson, filed on Feb. 14, 2007, disclosed a pet chew with rawhide and traditional bully stick (or steer penis) woven together. Since it's still a traditional bully stick product, it suffers the drawbacks of traditional bully stick aforementioned.

U.S. Pat. No. 8,074,609 B2 by Grant Adkins, filed on Mar. 25, 2010, disclosed a rawhide pet chew with a traditional bully stick wrapped in. But since it's still a traditional bully stick product, it suffers the drawbacks of traditional bully stick aforementioned.

U.S. Pat. No. 7,677,203 by Stern, filed on Nov. 21, 2006, disclosed a pet chew with a plant based outer casing and a chewy edible material positioned within the casing. However, it is silent about an intention to make a bully-stick-like product imitating bully stick. The products it disclosed have nothing to do with traditional bully stick, which doesn't have any features of imitating traditional bully stick. And it fails to disclose an extruded pet chew with pizzle ingredient.

U.S. patent application Ser. No. 14/295,009 by Doerr, filed on Jun. 3, 2014, disclosed a pet chew comprising an amylase filling and a collagen casing. However it is silent about an intention to form a pet chew that is artificial bully stick (or Bully-Stick-LIKE). It lacks of all necessary features that a traditional bully stick presents, for example bully stick shapes and structure. Thus it fails to attract consumers by working as a new product alternative to traditional bull stick product. Furthermore, it has a filling center that may use 40% bully pizzle material, however it fails to disclose how many pizzle ingredient percentage in weight exists in whole product formula, which makes it unable to label the product as "with pizzle" according to AAFCO rule. A disadvantage with this product is that, it has a collagen outer casing, where collagen material is considered to incur disadvantages such as: A, collagen material isn't inherently attractive making it fail to urge dogs to chew; B, manufacture of animal hide and collagen is relatively unregulated industry. It may create pollution to environment. H2O2 and NaOH chemicals that are used for rawhide manufacture and heavy metals may remain in finished products which harms dogs' health.

SUMMARY OF THE PRESENT INVENTION

An objective of the present invention is to provide a pet chew stick with pizzle ingredient imitating traditional bully stick products which is very much welcome by dogs and consumers.

Another objective of the present invention is to provide a pet chew with both "inherently good palatability" and "durability" simultaneously.

Another objective of the present invention is to provide an edible pet chew serving as an alternative to existing traditional Bully Stick product by imitate the structure, and/or appearance, and/or size, and/or color, and/or texture, and/or flavor, and/or durability, and/or palatability of traditional bully stick.

Another objective of the present invention is to provide an edible pet chew incorporate two existing popular products into a single product, where the two existing products are plant based extruded stick product and traditional bully stick product.

Another objective of the present invention is to provide an edible pet chew with an outer layer and an inner member, wherein the outer layer is with good durability and strength, which imitate a feature of traditional bully stick.

Another objective of the present invention is to provide an edible pet chew stick with a cross section outline shape similar to that of traditional bully sticks.

Another objective of the present invention is to provide an edible pet chew formed from a composition.

Another objective of the present invention is to provide an Artificial Bully Stick (or Bully-Stick-LIKE) pet chew which is hugely cheaper than traditional bully stick.

Another objective of the present invention is to provide an Artificial Bully Stick pet chew which is raw-material-acquisition comparatively hugely easier than traditional bully stick.

Another objective of the present invention is to provide an edible pet chew stick with pizzle material. The stick is obtained by extruding process with an extruder, so as to achieve the "chewy" property of the pet chew products.

An objective of the present invention is to provide an edible pet chew with limited animal hide ingredient in the products or even without animal hide ingredient.

An objective of the present invention is to provide an edible pet chew including an Artificial Bully Stick chew member and an edible material member being assembled together.

Additional advantages and features of the invention will become apparent from the description which follows, and may be realized by means of the instrumentalities and combinations particular point out in the appended claims.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

Reference now is made to the accompanying drawings in which.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

It should be noted that the term of "Bully stick" refers to a pet chew product of dehydrated animal (especially but not limited to bovine animal, bovine especially refers to bull or steer) pizzle, or segment thereof, for dogs to chew on, where the pizzle is derived from a natural animal penis cut from slaughtered animals (especially bovine), typically with foreskin being removed. Bovine (especially bull or steer) penis, known in pet chew market as pizzles. This bully stick is so called traditional bully stick made of dehydrated a natural part of an animal (especially bovine).

Pet chew stick of present invention is intended to work as an alternative to traditional GENUINE Bully Sticks aforementioned.

The term of "Artificial Bully Stick pet chew" (or say Bully-Stick-LIKE pet chew) in present invention refers a pet chew or a pet chew member in a shape of stick formed from a composition material, imitating the features of traditional GENUINE bully stick product including structure, and/or appearance, and/or size, and/or color, and/or texture, and/or flavor, and/or durability, and/or palatability, but it is not a traditional GENUINE bully stick.

It is known that a market-popular pet chew product should include two major factors, i.e. property of "chewy" (durability) and property of "inherently good palatability". "Chewy" means a material that can endure a dog's chewing for a long time before its being ingested. "Good palatability" means a material with inherent attractant to dogs without adding additional artificial flavorings. A market-successful pet chew product is required to have both properties. Artificial Bully Stick pet chew disclosed by present invention is a product with both "inherently good palatability" and "durability".

Figure 6:
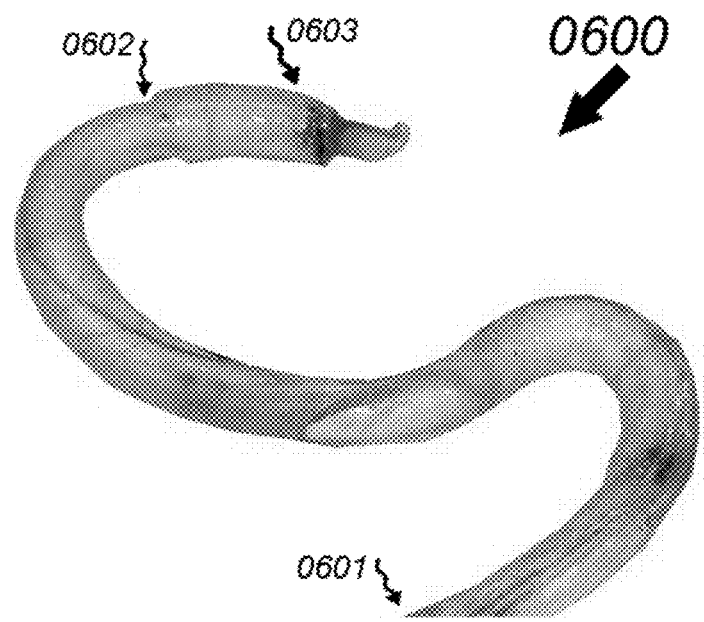
FIG. 6 is a prior art, a top plan view of a natural flesh of pizzle, which works as a starting material for producing traditional bully stick.

Before disclosing present invention, as a prior art, let's address a typical specification/structure and manufacturing process for these traditional GENUINE Bully Stick products as follows (from points 1 to 6):

1. Prepare natural flesh of pizzle. Now refer to FIG. 6 (Prior Art), 0600 gets ready which is cut from slaughtered bovine animal. 0601 is root of the bovine penis. Shaft part from point 0601 to 0602 is a typical portion of pizzle that is applied to make Bully Sticks. 0603 is glans of a pizzle, which is also can be included in finished products in some specific products.

Figure 7:
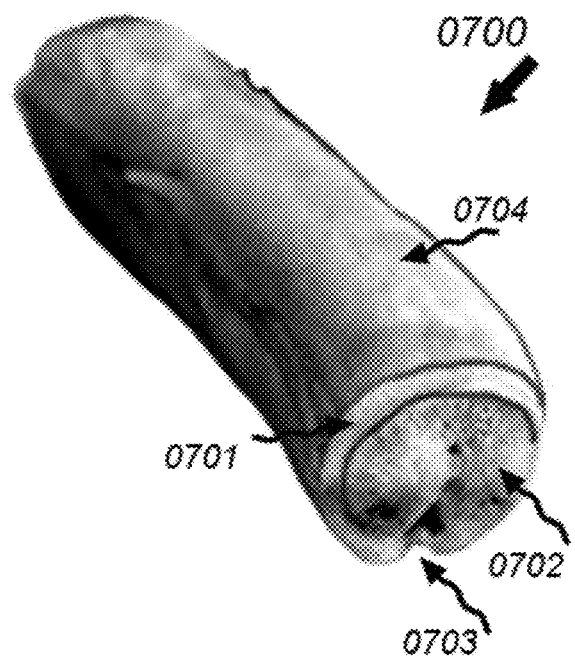
FIG. 7 is a prior art, a top plan view of a segment of fresh pizzle.

2. FIG. 7 (Prior Art) is a segment of fresh pizzle. 0703 refers to a groove longitudinally along the whole pizzle. 0701 is muscle of the pizzle, serving as an outer layer for the whole pizzle piece distinguished from the inner member 0702. 0704 is the surface of the pizzle. 0702 includes tissues of corpus cavernosum, spongiosum, urethra, etc.

Figure 8:
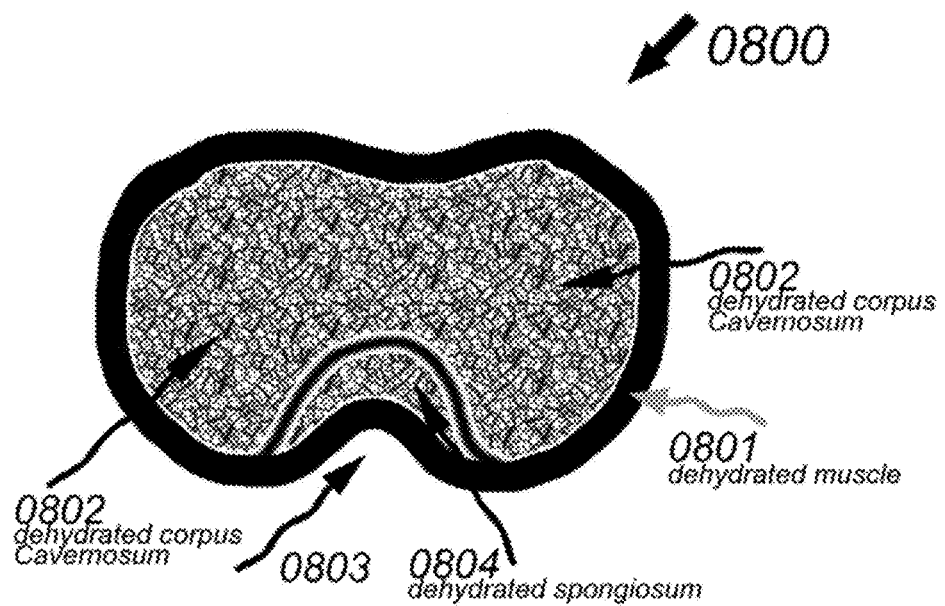
FIG. 8 is a prior art, a cross section view of a final traditional bully stick product after dehydrating process.

3. Having pizzle dehydrated by for example solar drying, heating or freeze drying. FIG. 8 (Prior Art) is a cross section figure for a final bully stick product after dehydrating process. This cross section is with a typical outline shape similar to letter "B". 0801 is dehydrated muscle with hard quality. 0802 is dehydrated corpus cavernosum. 0803 refers to a groove longitudinally along the pizzle. 0804 is dehydrated spongiosum.

Figure 9:
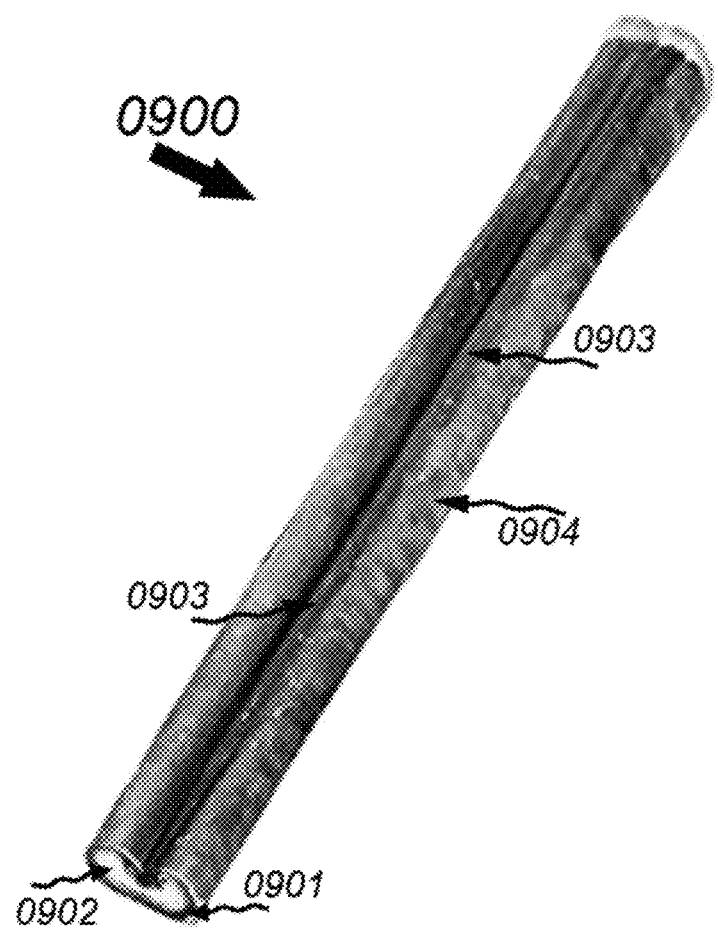
FIG. 9 is a prior art, a top plan view of a final product of a dehydrated bully stick with a typical cross section outline shape resembling letter "B".

4. FIG. 9 (Prior Art) is a final product, a dehydrated bully stick with a typical cross section outline shape similar to letter "B". 0901 and 0904 is hard outer layer of the bully stick made of dehydrated muscle. 0902 is inner member including tissues of corpus cavernosum, spongiosum, urethra, etc. 0903 refers to a groove longitudinally along the whole bully sticks body.

Figure 11:
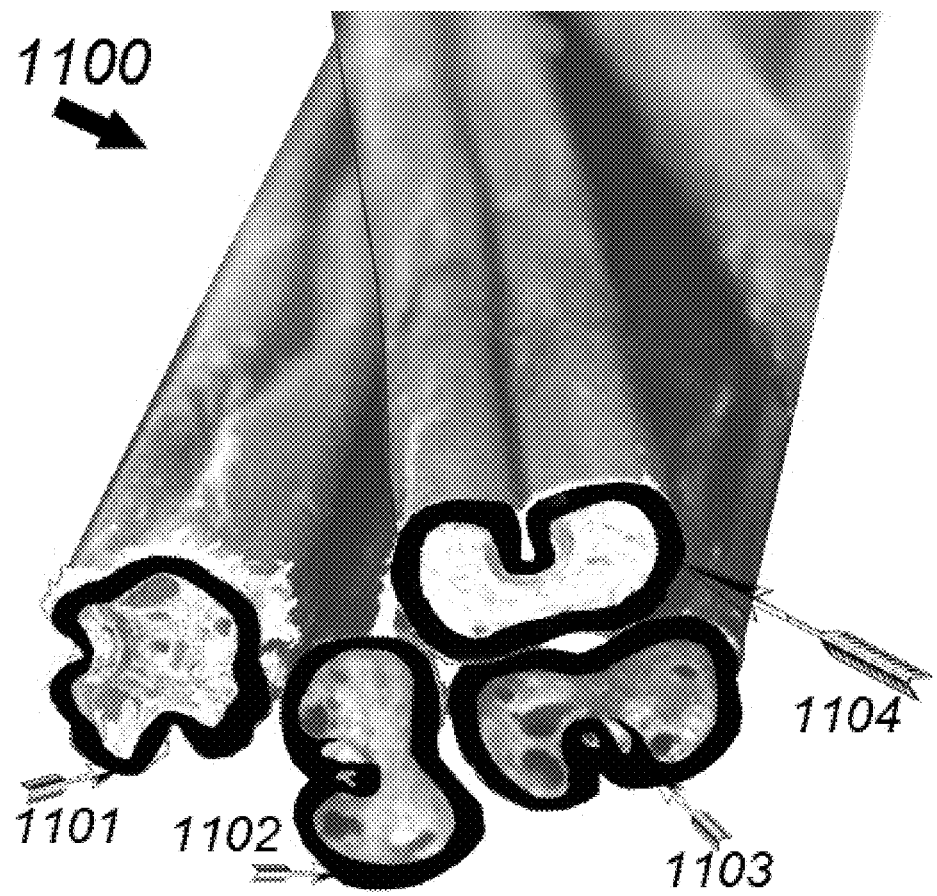
FIG. 11 is a prior art, a top plan view of a group of traditional bully stick products with various cross section outline shapes.

5. 1101, 1102, 1103 and 1104 in FIG. 11 (Prior Art) reflect a group of various cross section outline shapes that traditional bully sticks may have. Also 1201 to 1207 in FIG. 12 (Prior Art) reflect a group of various cross section outline shapes that traditional bully sticks may have 6. Typical outstanding features (including structure features) of Bully Stick product are derived from and determined by aforementioned natural bovine penis natural features. It is disclosed by present inventor that, traditional bully stick product has its essential typical features as follows (from A to K):

A. Bully stick includes an outer layer and an inner member, where the former holds the latter by surrounding it. This structure is derived from pizzle inherent structure. The outer layer is formed by muscle and inner member formed by tissues of corpus cavernosum, spongiosum, urethra, etc. Products in FIGS. 8 (Prior Art) and 9 (Prior Art) reflect this pet chew structure.

B. After being dehydrated, inherently, the outer layer of Bully Stick formed by muscle enjoys a property of getting hard. The hardness ideally accommodates dog's chewing desire, making it an ideal pet chew product. Traditional bully stick makes itself outstanding with a longest durability hardness.

C. It is inherently a stick shape product. And in some other bully stick products, it is initially a stick shape and is finally manipulated to a desired shape for example Spiral or Braid different from initial stick shape.

D. Bully stick has pizzle ingredient, which is a very strong flavor product enjoying an irresistible attraction to dogs. Pizzle ingredient offers "inherently good palatability" for the pet chew.

E. Cross section of traditional bully stick presents characteristic outline shapes. A typical outline is in a shape similar to letter "B", or peanut, or arabic numerals "8". Products in FIGS. 8 (Prior Art) and 9 (Prior Art) reflect this feature. Some other outline shapes are described in FIGS. 11 (Prior Art) and 12 (Prior Art). (These outline shapes created by inherent feature of natural pizzles)

F. An inherent groove appears longitudinally along the whole Bully Sticks body. Products in FIGS. 8 and 9 reflect this feature.

G. Typical properties of the outer layer include: being semi-transparent, and with fiber-like texture. (these two properties of outer layer are created by the nature of the muscle that forms the outer layer)

H. Typical range of thickness of the outer layer is 1 mm-5 mm.

I. Typical properties of the inner member include: spongy, comparatively more unconsolidated or looser in texture than the muscle outer layer. For example FIGS. 8 and 9, product 0800/0900 has an inner member 0802/0902 which includes tissues of corpus cavernosum, spongiosum, urethra, which is unconsolidated. And there are some small holes spread substantially homogeneously to the inner member body. Refer to FIG. 8, 0802 from bully stick has tiny holes. (these properties of inner member are created by the nature of corpus cavernosum and/or spongiosum tissues that exist in a pizzle)

J. Inner member color is lighter than outer layer color. Inner member color is typically white or yellowing white. Outer layer color is typically light brown, brown, dark brown, red brown or muscle color. For example 0902 from pet chew 0900 is in white color and 0901 is in light brown. Density of inner member is lighter than Bully Stick outer layer. For example 0902 is lighter than 0901 in density. (these properties of color recognition are created by the nature of a pizzle)

K. Pizzle flavor. Traditional bully stick has an inherent characteristic pizzle flavor, which greatly attracts dogs to chew.

All prior arts are silent with an intention to well imitate traditional Bully Stick with a composition material replacing the natural animal pizzle products. This new product requires surprising invention, where a skilled person with ordinary skills in this art can't disclose it. Especially, all prior arts are silent to create a pet chew with features of the following as a whole: it's an extruded stick with pizzle ingredient and plant ingredient, with a hard outer layers and an inner member, with cross section outline shape of "B", or peanut, or "8" and with a groove longitudinally along its stick body.

It is also surprisingly disclosed by present inventor that, primary features of present invention are to imitate the properties/features/structure of traditional Bully Stick aforementioned. It's disclosed by present inventor that, a pet chew product must necessarily bear at least one property/feature as described above (especially A, B and C), OR, the pet chew will fail to imitate traditional Bully Sticks.

Artificial Bully Stick (or Bully-Stick-LIKE) Pet Chew of present invention imitating genuine bully stick is now being disclosed to serve as an alternative to traditional GENUINE Bully Sticks aforementioned, with significantly lower product cost, imitating some necessary properties or features (at least including appearance features) of traditional Bully Stick. Artificial Bully Stick Pet Chew disclosed by present invention is distinguished from traditional Bully Sticks, which is typically an extruded stick product formed with a composition material with ground bovine pizzle. As a contrast, traditional Bully Stick is substantially a single ingredient product without being processed other than dehydrating process.

One advantage of the Artificial Bully Stick pet chew of present invention is hugely cheaper material cost than traditional bully stick. The Artificial Bully Stick pet chew is extremely cheaper than traditional bully stick which is made of substantially 100% bovine pizzle. The latter could be 4 times of the price of the former. Due to the natural scarcity property with the source of natural bovine pizzle, raw materials (bovine pizzle) for producing traditional bully sticks are sold at an extremely high price, which creates the final products, traditional bully sticks, being sold to consumers at an extremely high price. Another advantage is, easier acquisition of raw material v.s. traditional bully stick products. Producing traditional bully stick products requires huge volume of natural animal pizzle. The Artificial Bully Stick pet chew of present invention is formed from a composition partially with pizzle ingredient. For example the composition has 10% pizzle in formula (90% is non-pizzle ingredient which is extremely acquisition-easier material than pizzle), in which producing this product just requires one tenth of pizzle material to manufacture the same quantity of finished products v.s. traditional bully stick products. Preparing the composition materials for production of Artificial Bully Stick pet chew is much more easier than traditional bully sticks.

Figure 1:
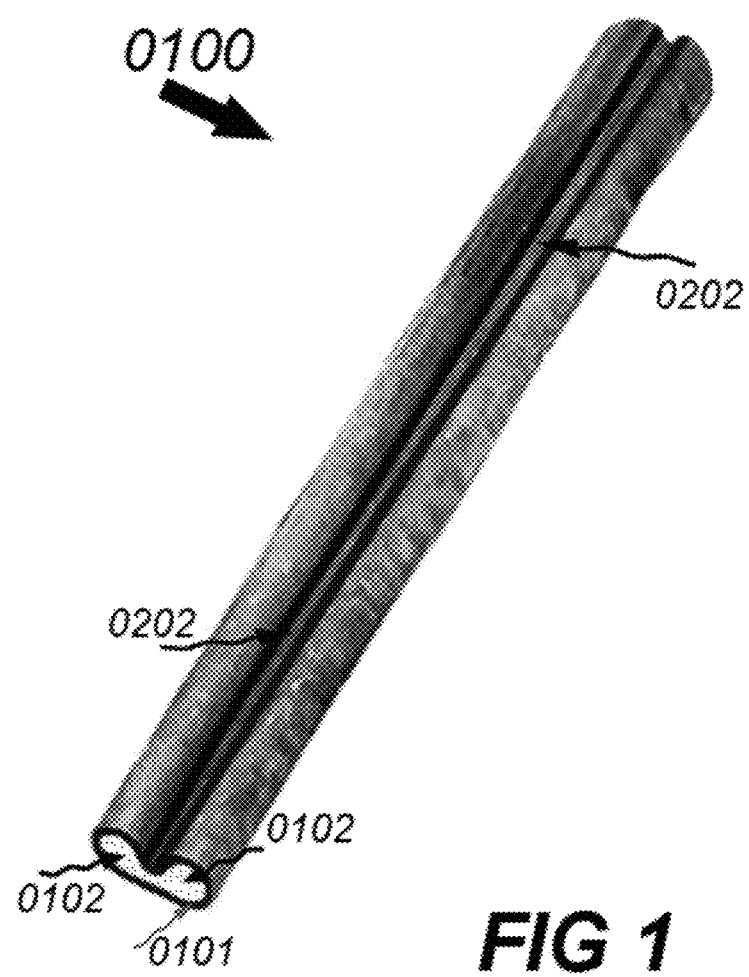
FIG. 1 is a top plan view of an Artificial Bully Stick (or say Bully-Stick-LIKE) pet chew with a stick configuration, with a cross section outline shape like letter "B".

Preferably, the Artificial Bully Stick (or Bully-Stick-LIKE) pet chew (or pet chew member) of present invention includes an outer layer and an inner member, where the former holds the latter by surrounding it, in a purpose to imitate a typical feature of traditional Bully Sticks. Preferably, the thickness of the outer layer is homogenous along the whole stick body, like traditional bully stick. Now refer to FIG. 1, 0100 is an extruded pet chew with outer layer of 0101 and inner member of 0102. Typically, the outer layers serves as an outer casing for the pet chew surrounding the inner member, together forming a stick shape product.

Cross section outline shape of the Artificial Bully Stick pet chew of present invention resembles the cross section outline shape of natural Bully Sticks, with a purpose to imitate Bully Sticks. Natural bully sticks have various cross section outline shapes which are inherently determined by raw material of pizzles. Preferably, cross section of the Artificial Bully Stick pet chew of present invention is substantially with an outline shape similar to letter "B", or peanut, or arabic numerals "8", imitating a typical cross section outline shape of traditional bully sticks as aforementioned. Now refer to FIG. 1, 0100 is an extruded pet chew with a typical cross section outline shape similar to letter "B", with a purpose to imitate a typical cross section outline shape of traditional bully sticks.

Figure 12:
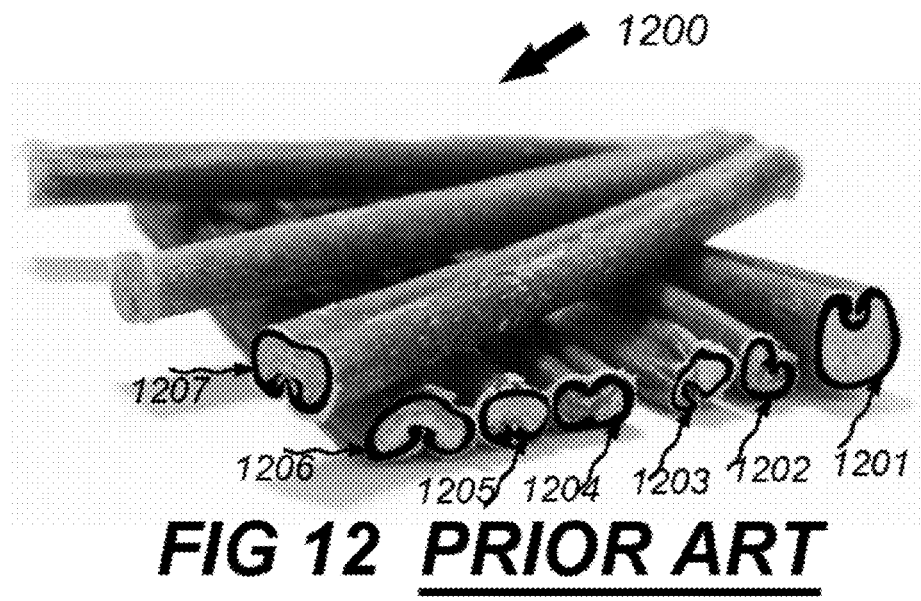
FIG. 12 is a prior art, a top plan view of another group of traditional bully stick products with various cross section outline shapes

Some other alternative outline shapes for the Artificial Bully Stick (or Bully-Stick-LIKE) pet chew can refer to the various ones that traditional bully stick may feature with as described in FIGS. 11 and 12.

Preferably, Artificial Bully Stick pet chew (or pet chew member) of present invention has a groove longitudinally along the whole pet chew stick body, with a purpose to imitate a typical inherent groove of traditional Bully Stick products. Now refer to FIG. 1, 0100 is an extruded pet chew with 0202, the groove along the stick body to imitate natural Bully Sticks, which is formed by extruder die with pre-design shape forming a groove in extruding process.

It should be noted that, all prior arts are silent to create a pet chew with features of the following AS A WHOLE: it's an artificial bully stick, it's an extruded stick formed from a composition material with pizzle ingredient and plant ingredient, with a hard outer layers and a inner member, with cross section outline shape of "B", or peanut, or "8" and with a groove longitudinally along its stick body.

Preferably, outer layer of the Artificial Bully Stick (or Bully-Stick-LIKE) pet chew stick of present invention is semi-transparent. And preferably, the outer layer presents fiber-like texture. These are in a purpose to imitate a typical outer layer texture of traditional Bully Sticks. The thickness of outer layer of the Artificial Bully Stick of present invention is typically 1 mm-5 mm, imitating the thickness feature of traditional bully stick products.

Preferably, inner member of the Artificial Bully Stick pet chew of present invention is comparatively more unconsolidated or looser in texture than the muscle outer layer. Preferably, inner member of the Artificial Bully Stick pet chew of present invention has some small holes spread substantially homogeneously to the inner member body. Now refer to FIG. 1, 0100 is an extruded pet chew with inner member 0102 comparatively looser than muscle out layer 0101. Preferably, there are some tiny holes spread substantially homogeneously to the inner member body.

Preferably, inner member color of the Artificial Bully Stick (or Bully-Stick-LIKE) pet chew is lighter than outer layer color. Now refer to FIG. 1, 0100 is an extruded pet chew with inner member of 0102 is lighter than muscle outer layer 0101 in color. Inner member color is typically white or yellowing white. Outer layer color is typically light brown, brown, dark brown, red brown or muscle color.

Preferably, the Artificial Bully Stick (or Bully-Stick-LIKE) pet chew includes artificial pizzle flavor (or say bully stick flavor) in its formula, which further enhances its attraction to consumers.

In some embodiments of present invention, the outer layer hardness of the Artificial Bully Stick pet chew is with a durometer value between 80 and 100. In other embodiments of present invention, the outer layer hardness of the edible pet chew is with a durometer value between 60 and 80. In other embodiments of present invention, the outer layer hardness of the edible pet chew is with a durometer value between 50 and 60. In other embodiments of present invention, the outer layer hardness of the edible pet chew is with a durometer value between 40 and 50.

Now to disclose formulas that form the Artificial Bully Stick (or Bully-Stick-LIKE) pet chew.

Now to define the phrase of "on an as formulated basis" in present invention that may be used in following paragraphs. It is about a means to determine weight percentages of an ingredient in a product. "On an as formulated basis" is also a method that currently FDA (or AAFCO) organizations of USA usually utilize to determine weight percentage for an ingredient in a product. By the means of "on an as formulated basis", the weight percentage of an ingredient in a food is determined as it is added in the formulation of the food, including its inherent water content, not counting the water added for processing. All weight percentage values of ingredients appearing in present invention apply this "on an as formulated basis" rule.

The formula of the Artificial Bully Stick (or Bully-Stick-LIKE) pet chew of present invention includes pizzle (or animal penis) ingredient on an as formulated basis. The advantages of including pizzle ingredient in the formula go as follows (from point 1 to 4):

1. This product is an extruded Artificial Bully Stick pet chew with composition materials intended to imitate the properties of traditional bully stick products. A formula with pizzle will make the pet chew not only with a traditional bully stick appearance, but also with real bully stick ingredients, where product formula feature is in conformity with product appearance. Selling points of finished products are enhanced by the conformity.

2. Another advantage of applying pizzle ingredient to the Artificial Bully Stick pet chew formula is that, it provides a perfect means to make full use of pizzle leftovers created from genuine bully stick manufacturing industry. A marketable genuine bully stick need be fairly long, for example at least longer than 4". A bully stick product less than for example 4" has a jeopardy of dog choking. Most popular bully stick length welcome by consumers is 6" and 12". Producing 6"/12" bully sticks by cutting a pizzle with initial length to desired length certainly generate a lot of small sized pizzle segments. These segments were purchased with a full price but manufacturers didn't come up with a method to make good use of them. The Artificial Bully Stick pet chew of present invention can well make use of the pizzle segments by for example grinding them to small piece and having them added to its composition formula.

3. Yet another advantage of applying pizzle ingredient to the Artificial Bully Stick pet chew formula is that, the pizzle ingredient can provide natural pizzle flavor to the pet chew without adding artificial flavors. Natural pizzle flavor is thought to be healthier element than artificial pizzle flavor.

4. Pizzle ingredient is a natural premium protein source for a pet chew product.

Preferably, the Artificial Bully Stick (or Bully-Stick-LIKE) pet chew of present invention includes at least 3% pizzle (or animal penis) ingredient in formula. The reason why it has to be with "at least 3%" pizzle ingredients goes as follows (point 1 and 2):

1. "At least 3% pizzle" provides basic inherent attractant attracting dogs to chew on. Per palatability tests conducted by present inventor, this Artificial Bully Stick pet chew with less than 3% can't provide basic inherent attraction to dogs without aid of other attractant ingredient. "At least 3% pizzle" offering "start point" palatability. We conducted palatability contrast tests to determine the smallest percentage of pizzle ingredient to put into the Artificial Bully Stick pet chew. The test interprets that when the pizzle percentage goes up to 3% or larger than 3%, a jump of number of preference appears v.s. plain extruded stick chews w/o pizzle ingredient. And the preference is consistent when the pizzle percentage stays at 3% to 10%. Therefore 3% is determined to be the minimum pizzle percentage in the Artificial Bully Stick pet chew.

2. At least 3% pizzle in formula enables product labeling to claim "with pizzle", or "with real pizzle", or "with bully stick ingredient" or "with real bully stick" on consumer packages, enhancing product selling points to consumers. A product with less than 3% pizzle can't indicate "with pizzle" on package labels legally. This is a favorable advantage for the Artificial Bully Stick pet chew product to indicate "with pizzle" as a part of product name which makes the product attractive to consumers (remarks: if the ingredient goes to at least 25%, it will be applied with "dinner" rule in labeling). According to labeling model regulations by AAFCO (the Association of American Feed Control Officials), an ingredient can't appear as a part of product name or be highlighted on the principal display panel if the ingredient accounts for less than 3% in product formula on an as formulated basis.

In some embodiments, the Artificial Bully Stick (or Bully-Stick-LIKE) pet chew (or pet chew member) includes 3%-50% pizzle ingredient.

In some embodiments, the Artificial Bully Stick (or Bully-Stick-LIKE) pet chew (or pet chew member) includes 5%-65% (more typically 10%-25%) pizzle ingredient on an as formula basis in its formula. The Bully-Stick-LIKE pet chew (or pet chew member) with over 50% (especially over 65%) pizzle ingredient is considered too expensive, which could violate the initial intention of introducing this product. Also The Artificial Bully Stick pet chew (or pet chew member) with over 50% (especially over 65%) pizzle ingredient is considered to be able to ruin the "durability" of the pet chew. The reason is, the more an extruded pet chew contains meat (meat by-product), the less durability the extruded pet chew will be with. Pizzle is an animal source meat-by-product-ingredient. According to R&D findings by the inventor, 10%-25% pizzle ingredient in the Artificial Bully Stick pet chew (or pet chew member) is an optimized one, which provides a balance between durability, material cost, sufficient inherent natural pizzle flavor and natural protein source.

We conducted palatability contrast tests to determine the starting percentage of pizzle ingredient to put into the Artificial Bully Stick pet chew that can secure an absolute preference for dogs for the pet chew. The test interprets that when the pizzle percentage goes up to 10% or larger than 10%, an absolute preference appears v.s. plain extruded stick chews w/o pizzle ingredient. On the other hand, the more pizzle in a pet chew, the more expensive the pet chew will be. 10%-25% is a preferred pizzle percentage range in the Artificial Bully Stick pet chew that can provide a balance between "palatability" and cost.

Preferably, the Artificial Bully Stick (or Bully-Stick-LIKE) pet chew of present invention includes a plant ingredient in the formula. This Artificial Bully Stick pet chew product is an extruded product. Plant ingredient is an often-used material for extruded products with advantages of (point 1, 2 and 3):

1. Significantly lower cost than animal ingredients.

2. Provides vegetable nutrition offering a nutrition balance and a healthy diet.

3. Facilitates to make the Artificial Bully Stick pet chew with ideal durability/hardness which enables it to imitate this essential property of traditional bully sticks. Plants especially plant starch is a good material for extruded products which can facilitate the achievement of ideal durability/hardness especially in an extruding process. A theory explains how it works: When the starch part of plant material is cooked or heated at a particular temperature in extruder (the temperature is generally >40° C. and what the particular temperature depends on the nature of various types of the starch), heat causes the crystalline regions of the starch to become diffuse, so that the chains begin to separate into an amorphous form. The intermolecular bonds of starch molecules begin to break down. Starch dissolves in water to a sort of paste status. Thus gelatinization occurs in the starch which offers the durability/hardness property for the pet chew.

A typical material working as a plant ingredient is plant starch, such as (but not limited to) corn starch, sweet potato starch, tapioca starch and potato starch.

In some embodiments, the pet chew product includes 20%-95% (typically 20%-50%) plant ingredient in weight on an as formulated basis.

It should be noted that the "plant" ingredient in present invention refers to all edible plant materials and edible-plant-derived materials, such as (but not limited to) vegetables, fruit, edible-plant-derived materials, vegetable-derived materials, fruit-derived materials, plant protein, vegetable protein, plant starch, vegetable starch, grains, cereals, corn, gluten-free edible plant and gluten-free vegetables. Gluten-free plant and gluten-free vegetables are preferred materials to form the "plant ingredient" since gluten materials are considered by experts in this industry as the ones that could potentially make dogs allergic. Examples of gluten-free plant material are tapioca, soybean, sweet potato, potato and carrot.

The reasons why it is preferred to be with "<50% plant ingredients" goes as follows:

Since dogs are carnivorous, plant material does not attract pets very much. A pet chew product with too high plant percentage (over 50%) existing in the formula is less attractive to dogs, since dogs do not prefer vegetal material. Our tests indicate that, in an extruded pet chew product, <50% plant ingredient by weight can achieve a good malleability and durability for an extruded piece. Too much plant ingredients in it will reduce the palatability or attraction of the pet chew significantly. Our tests indicate that, in a pet chew product, when plant ingredient being >50% by weight, plant ingredient will be an absolutely primary ingredient, which makes the pet chew NOT good in palatability performance and not attractive to dogs. Therefore, in a pet chew product, ">50% plant ingredient isn't a preferred option to form the extruded pet chew of the present invention.

Preferably, the Artificial Bully Stick (or Bully-Stick-LIKE) pet chew stick is typically with a length of about 6" or 12", which is considered as most popular stick length welcome by consumers. Diameter of the chew stick could be 1 cm to 5 cm.

Preferably, the Artificial Bully Stick (or Bully-Stick-LIKE) pet chew member includes a meat (meat by-product) ingredient in the formula.

It should be noted that the "meat" ingredient in present invention is defined as the material selected from (but not limited to) the group consisting of: animal flesh, animal muscle, poultry meat, chicken, chicken breast, duck, goose, turkey, venison, porcine meat, pork, bovine meat, beef, mutton, lamb, goat meat, fish, meat meal, chicken meal, fish meal, meat derived ingredient and poultry derived ingredient.

It should also be noted that the "meat by-product" ingredient in present invention is defined as the material typically selected from (but not limited to) the group consisting of: porcine meat by-product, poultry by-product, bovine meat by-product, animal viscera, animal stomach, animal tongue, animal kidney, animal blood, animal bone, partially defatted low temperature fatty tissue, animal intestines, animal spleen, animal liver, animal lung, animal heart, animal pizzle, meat by-product meal, poultry by-product meal, meat by-product derived ingredient, poultry by-product derived ingredient, animal fat and animal oil. It should be noted that the "meat by-product" in present invention doesn't include animal hide/skin material and collagen material with the reasons of: A, both animal hide/skin material and collagen don't have attractive flavor urging dogs to chew. B, manufacture of animal hide and collagen is relatively unregulated industry. It may create pollution to environment. H2O2 and NaOH chemicals that are used for rawhide manufacture and heavy metals may remain in finished products which harms dogs' health.

Meat (meat by-product) ingredient is an often-used material for extruded products with advantages of (point 1 and 2):

1. Inherent good palatability. Dogs are carnivorous, which have an inherent appetite to eat meat (meat by-product) food. Meat (meat by-product) ingredients in a pet chew works as an attractant providing inherent good palatability for the pet chew.

2. Nutrition. Meat (meat by-product) as a perfect source of animal protein, offering a good nutrition to dogs.

In some embodiments, the Artificial Bully Stick (or Bully-Stick-LIKE) pet chew (or pet chew member) includes 3%-80% (typically 10%-50%) meat ingredients in its formula on an as formula basis.

The reason why it has to be with "at least 3% meat (meat by-product) ingredients" goes as follows (point 1 and 2):

1. "At least 3% meat (meat by-product)" provides basic inherent attractant attracting dogs to chew on. Per palatability tests conducted by present inventor, this Artificial Bully Stick pet chew with less than 3% can't provide basic inherent attraction to dogs without aid of other attractant ingredient. "At least 3% meat (meat by-product)" offering "start point" palatability.

2. At least 3% meat (meat by-product) in formula enables product labeling to claim "with meat (meat by-product)" or "with real meat (meat by-product)" on consumer packages, enhancing product selling points to consumers. A product with less than 3% meat (meat by-product) can't indicate "with meat (meat by-product)" on package labels legally. This is a favorable advantage for the Artificial Bully Stick pet chew product to indicate "with meat (meat by-product)" as a part of product name which makes the product attractive to consumers (remarks: if the ingredient goes to at least 25%, it will be applied with "dinner" rule in labelling). According to labeling model regulations by AAFCO (the Association of American Feed Control Officials), an ingredient can't appear as a part of product name or be highlighted on the principal display panel if the ingredient accounts for less than 3% in product formula on an as formulated basis.

Preferably, in addition to pizzle ingredient, the Artificial Bully Stick (or Bully-Stick-LIKE) pet chew further includes a chemical in formula. The chemical is introduced to provide the Artificial Bully Stick pet chew sufficient rigidity/durability and strength in finished product. The chemical is selected from the group consisting of a thickener, a humectant, a stabilizer, an emulsifier, a gelatinizer, a binder and a filler.

The thickener is selected from the group consisting of: glucose syrup, malt syrup, soy protein Isolate, wheat protein isolate, corn protein isolate, artemisia gum, linseed gum, deacetylated chitin, pectins, sodium alginate, xanthan gum, carrageenan; phosphated distarch phosphate, sodium lactate, diacetyl tartaric acid ester of mono(di)glycerides(DATAE), sesbania gum, polyglycerol esters of fatty acid (polyglycerol monostearate, polyglycerol monooleate), maltitol, sorbitol, propylene glycol, ablmoschus manihot gum, β-cyclodextrin, arabic gum, starch acetate, guar gum, potassium alginate, carob bean gum, gellan gum, sodium polyacrylate, distarch phosphate, gelatin, hydroxypropyl, distarch phosphate, hydroxypropyl methyl cellulose, agar, acid treated starch, sodium carboxy methyl cellulose, oxidized starch and oxidized hydroxypropyl starch.

The humectant is selected from the group consisting of: soy protein Isolate, wheat protein isolate, corn protein isolate, glucose syrup, malt syrup, sodium pyrophosphate, trisodium orthophosphate, sodium hexametaphosphate, sodium tripolyphosphate, phosphoric acid, calcium dihydrogen phosphate, sodium lactate, maltitol, sorbitol, propylene glycol, glycerin, sodium dihydrogen phosphate, sodium phosphate dibasic, potassium lactate, sodium lactate, acetylated distarch phosphate and acetylated distarch adipate.

The stabilizer is selected from the group consisting of: trisodium orthophosphate, potassium sorbate, sodium stearoyl lactylate, calcium stearoyl lactylate, phosphoric acid, hydroxypropyl starch, pectins, xanthan gum, carrageenan, sodium lactate, polyglycerol esters of fatty acid (polyglycerol monostearate, polyglycerol monooleate), maltitol, sorbitol, propylene glycol, propylene glycol esters of fatty acid and glucono delta-lactone.

The emulsifier is selected from the group consisting of: soy protein Isolate, wheat protein isolate, corn protein isolate, Sucrose esters of fatty acid, sodium hexametaphosphate, sodium stearoyl lactylate, calcium stearoyl lactylate, hydroxypropyl starch, pectins, carrageenan, diacetyl tartaric acid ester of mono(di)glycerides (DATAE), polyglycerol esters of fatty acid (polyglycerol monostearate, polyglycerol monooleate), maltitol, sorbitan monolaurate, sorbitol, propylene glycol, propylene glycol esters of fatty acid, polyoxyethylene xylitan monostearate, tripolyglyceryl monostearate, potassium stearate, mono-(di-,tri-)glycerides of fatty acids, modified soybean phospholipid, sodium caseinate, citric and fatty acid esters of glycerol, lactic and fatty acid esters of glycerol, sodium starch octenyl succinate and acetylated monoand diglyceride (acetic and fatty acid esters of glycerol).

The gelatinizer is selected from the group consisting of: soy protein Isolate, wheat protein isolate, corn protein isolate, propylene glycol, glucono delta-lactone.

The binder is selected from the group consisting of: glutinous rice flour, gelatin, linseed gum, pectins, xanthan gum, carrageenan, sesbania gum, maltitol, sodium alginate, ablmoschus manihot gum, arabic gum, guar gum, Carob bean gum, gellan gum and agar.

The filler is selected from the group consisting of: a plant material, a plant derived material, a plant protein and a plant starch, saccharide, dextrin, lactose, mineral salt and fructose.

In some embodiments, the Artificial Bully Stick (or Bully-Stick-LIKE) pet chew of present invention is free of animal hide/skin materials and/or free of collagen materials with the concerns of drawbacks of animal hide/skin and collagen mentioned in previous paragraph.

In some embodiments to form a composition for making the Artificial Bully Stick (or Bully-Stick-LIKE) pet chew, in addition to pizzle ingredient, animal hide material is used. A small percentage of animal hide (for example <20%) may help strengthen the durability of the pet chew stick. But due to the disadvantages of animal hide material as mentioned in above Paragraphs, animal hide material to be used to form the composition is required to be at a limited percentage by weight. It's anticipated that when animal hide percentage in the composition goes higher than 50%, animal hide material will be an absolute majority ingredients existing in the pet chew formula, which makes the pet chew product a animal hide based product. A pet chew product made from animal hide based material is thought to significantly involve in an unhealthy product concern and environment harm concern. Therefore, it's preferred that in the embodiments that animal hide exists in the formula of the Artificial Bully Stick pet chew, animal hide material account for less than 50% in weight in its formula. More typically, animal hide material account for 5%-20% in weight in its formula.

In some embodiments of present invention, the Artificial Bully Stick (or Bully-Stick-LIKE) pet chew of present invention includes a pizzle ingredient and a plant ingredient in the formula.

In some other embodiments of present invention, the Artificial Bully Stick (or Bully-Stick-LIKE) pet chew of present invention includes a pizzle ingredient, a plant ingredient and a meat ingredient in the formula.

In some other embodiments of present invention, the Artificial Bully Stick (or Bully-Stick-LIKE) pet chew of present invention includes a plant ingredient and a meat ingredient in the formula, forming a pet chew with texture resembling that of traditional bully stick product. All prior arts fail to disclose that plant and meat ingredients with a proper content percentage existing in a composition material can enable the composition material extruded sticks to obtain a finished product texture resembling that of traditional bully stick product.

In yet some other embodiments of present invention, the Artificial Bully Stick pet chew of present invention includes a pizzle ingredient, a plant ingredient and a meat by-product ingredient in the formula.

In an embodiment of present invention, the Artificial Bully Stick (or Bully-Stick-LIKE) pet chew of present invention includes 5%-25% pizzle, 20%-50% plant ingredient, 10%-50% meat ingredient and a chemical.

In an embodiment of present invention, the Artificial Bully Stick (or Bully-Stick-LIKE) pet chew of present invention includes 5%-25% pizzle, 50%-90% plant ingredient and a chemical.

In an embodiment of present invention, the Artificial Bully Stick (or Bully-Stick-LIKE) pet chew of present invention includes 5%-25% pizzle, 20%-50% plant ingredient, 10-50% animal skin ingredient and a chemical.

Figure 13:
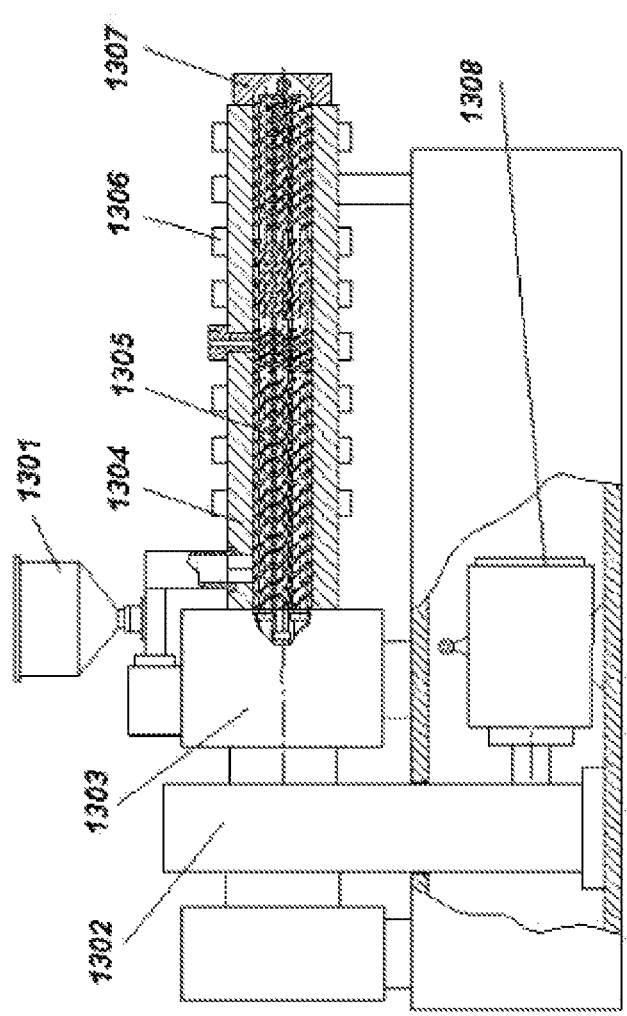
FIG. 13 is a prior art, a top plan view of a typical extruder, a machine system for producing pet chew products.

Preferably, the Artificial Bully Stick (or Bully-Stick-LIKE) pet chew is formed by extruding process with an extruder (typically co-extruding process). The reasons for a preference of extruding process include: A, Extruding process can achieve an outer layer texture imitating that of traditional bully sticks. Extruding process is viewed as the best one. While being extruded, a pressure acts on the composition material which provides durability/texture to finished products; B, perfect for a stick shaped product. C, Extruding is a very efficient process, which provides a low cost processing for making the products; D, Provides large capacity for a single workshop with limited scale. Co-extruding is a preferred process to produce this pet chew stick product because co-extruding process can well provide two separate pet chew members (outer layer and inner member) with different quality, which imitates traditional bully sticks. Now refer to FIG. 13, a drawing of a typical extruder, a machine system for producing pet chew products. The components of the extruder are as follows: 1301—hopper, 1302—reduction gearbox, 1303—power distributor, 1305—screw, 1306—heater, 1307—extruder die and 1308—motor.

In some embodiments of present invention, the pet chew sticks are formed by co-extruding process and the formula forming the outer layer is different from the one forming the inner member. The intention to apply different formulas to the outer layer and the inner member is to achieve different texture, and/or looking, and/or coloring, and/or durability/hardness, and/or density, etc., which could make one distinguished from the other, imitating traditional bully stick products.

As a preferred process for making the Artificial Bully Stick (or Bully-Stick-LIKE) pet chew of present invention, it includes (from point A to D):

(A). Prepare composition A and B. (Composition A is for forming outer layer of the Artificial Bully Stick pet chew and Composition B is for forming inner member of the Artificial Bully Stick pet chew. At least one of A and B has pizzle ingredient in its formula. The whole pet chew formula may include 20%-50% plant ingredient, 10%-50% meat (meat by-product) ingredient and 5%-25% pizzle)

(B). Deliver the Composition A and Composition B into a co-extrusion extruder, and heat the compositions in the extruder at a high temperature at least 40° C. before their being extruded at the extruder die to a stick form. Extrude the compositions with the extruder.

(C). Divide the extruded stick to pre-determined smaller sized ones with finished pet chew product form.

(D). Dry and harden the product by heating for sufficient time and obtain a final finished dog chew product. Moisture of final finished products is 8%-18%.

Here goes some embodiments of present invention with various pet chew shapes/configurations.

Figure 3:
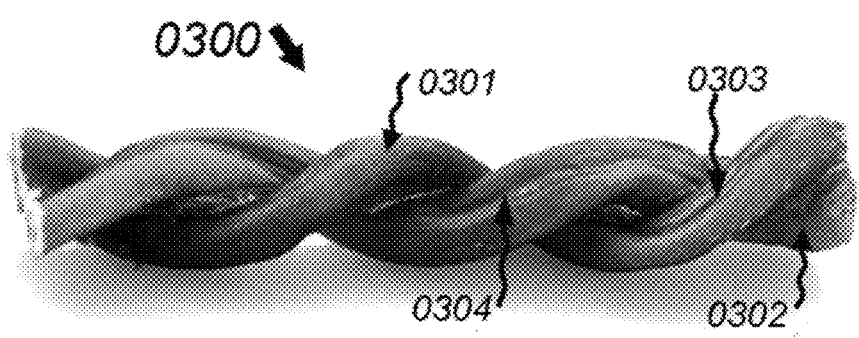
FIG. 3 is a top plan view of a pet chew with two separate members of Artificial Bully Stick members, being woven together.

Now refer to FIG. 3, 0300 is an embodiment of present invention, an edible pet chew with two separate Artificial Bully Stick chew sticks (0301 and 0302) woven together. 0303 is a groove existing in chew stick 0301. 0304 is a groove existing in chew stick 0302.

Figure 4:
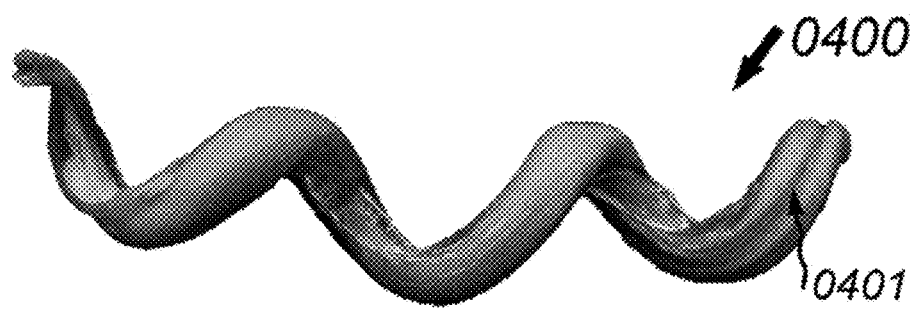
FIG. 4 is a top plan view of an Artificial Bully Stick pet chew with a spiral configuration.

Now refer to FIG. 4, 0400 is an embodiment of present invention, an Artificial Bully Stick pet chew in a spiral shape formed from originally stick shape. 0401 is a groove existing in the chew stick.

Figure 2:
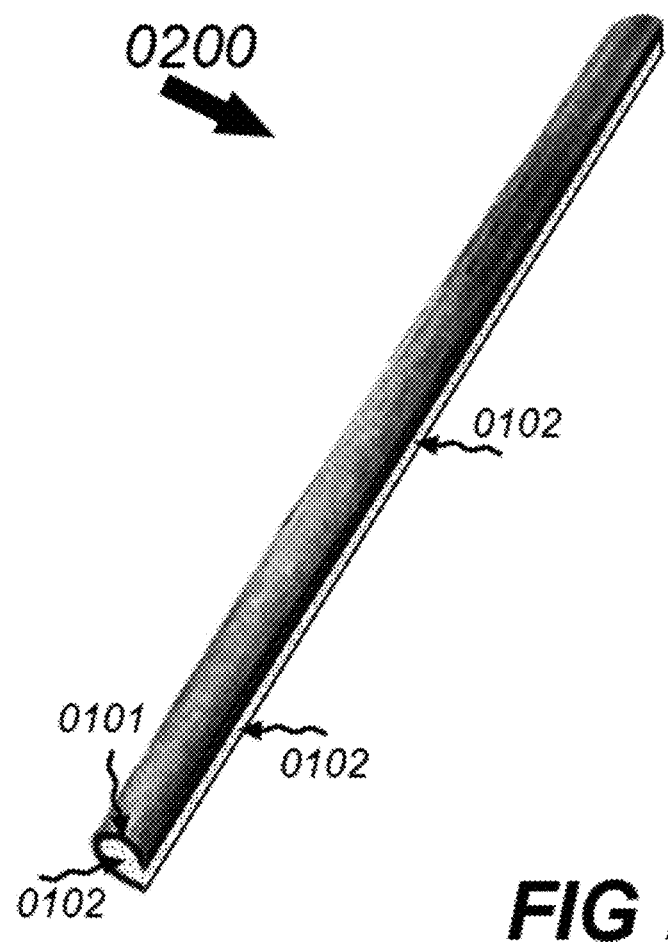
FIG. 2 is a top plan view of an Artificial Bully Stick (or Bully-Stick-LIKE) pet chew which is formed by splitting pet chew of 0100.
Figure 10:
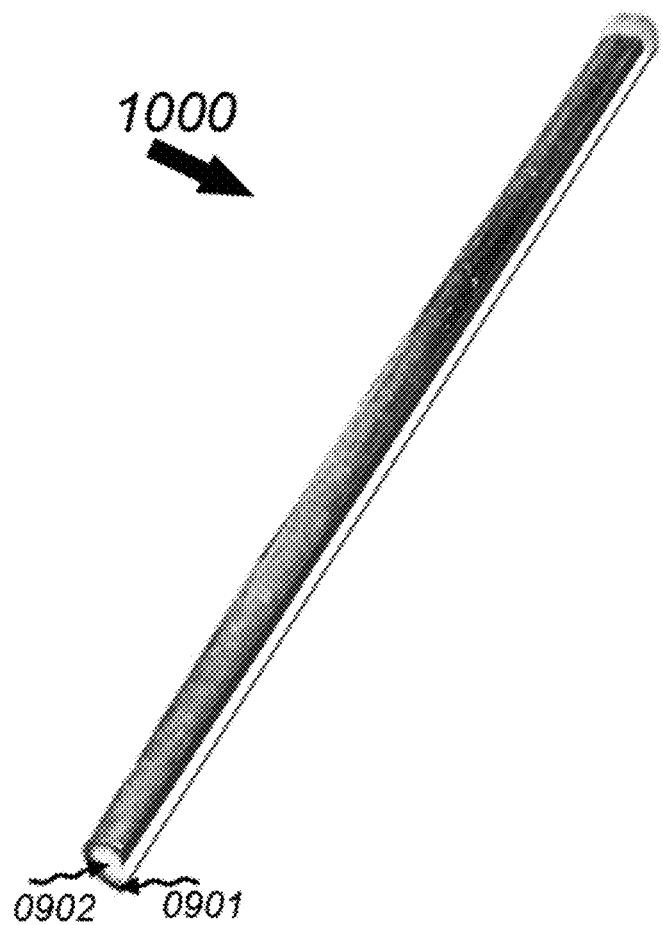
FIG. 10 is a prior art, a top plan view of a traditional bully stick product which is formed by splitting pet chew of 0900

In the market of traditional bully stick, sometimes original bully stick is longitudinally split to several separate pieces of slimmer sticks with desired diameters. The slimmer sticks are packed as final products for consumers. Product 1000 in FIG. 10 (Prior Art) is an example of this split bully stick. 0901 in FIG. 10 derives from original 0901 from FIG. 9 which is the outer layer of the bully stick. 0902 in FIG. 10 derives from original 0902 from FIG. 9 which is the inner member of the bully stick. In some embodiments of present invention, Artificial Bully Stick pet chew imitates the traditional bully stick that is longitudinally split traditional bully stick as above-described. Now refer to FIG. 2, 0200 is a Artificial Bully Stick pet chew stick imitating longitudinally split traditional bully stick.

Figure 5:
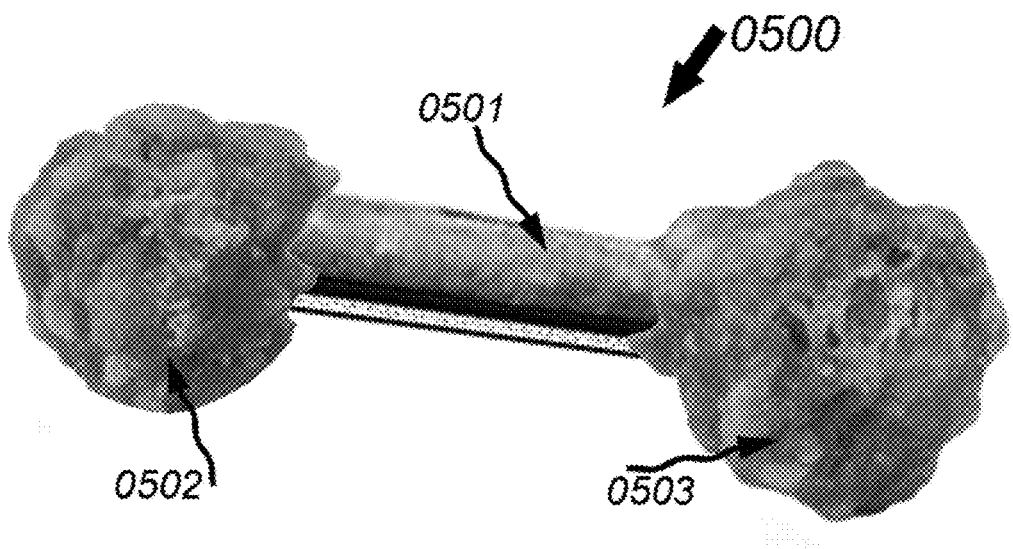
FIG. 5 is a top plan view of a dumbbell-shape edible pet chew with a member of Artificial Bully Stick chew stick 0501 and two members of composition balls 0502/0503.

Now refer to FIG. 5. 0500 is a dumbbell-shape edible pet chew with a member of Artificial Bully Stick chew stick 0501 and two members of balls 0502/0503 which formed from a composition material. Members of 0502/0503 are hand-made dough (balls) with ingredients including chicken breast (30%-60%), plant protein, rice flour, glycerin, being attached to chew stick 0501 at the two ends of 0501. Member of chew stick 0501 is a chew stick same as 0200 in FIG. 2. The number of composition ball could also vary according from 1 to 5 according to desire.

In some embodiments of present invention, an Edible Material member is applied together with a member of Artificial Bully Stick chew stick 0100, where the edible material member and the Artificial Bully Stick member are assembled together to form a pet chew. The Artificial Bully Stick chew stick 0100 may be pre-shaped to a new shape before being assembled with the edible material member according to desired finished pet chew structure.

In some embodiments of present invention, a member of animal hide (say rawhide) may be applied together with a member of Artificial Bully Stick chew stick 0100, where the animal hide (say rawhide) member and the Artificial Bully Stick member are assembled together to form a pet chew. The Artificial Bully Stick chew stick 0100 may be pre-shaped to a new shape before being assembled with the animal hide member according to desired finished pet chew structure.

As a formula embodiment to form the composition to produce the Artificial Bully Stick (or Bully-Stick-LIKE) pet chew stick, the composition is consisting of: Rice flour (67.2%, classified as plant ingredient), vegetable glycerin (8%), gelatin (7%), fresh chicken breast (5% classified as meat ingredient), ground pizzle (3%, classified as pizzle ingredient), cellulose powder (2%, classified as plant ingredient), calcium carbonate (2%), sweet potato (2%, classified as plant ingredient), lecithin (1%), carrageenan gun (1%), brewers yeast (1%), titanium dioxide (0.4%), FD&C yellow 6 (0.2%), FD&C red 40 (0.1%), FD&C blue 1 (0.1%). In this formula, pizzle ingredient occupies 3% in the formula, plant ingredient totally 71.2%, and meat 5%. Vegetable glycerin, calcium carbonate and carrageenan gum are some chemicals.

As another formula embodiment to form the composition to produce the Artificial Bully Stick (or Bully-Stick-LIKE) pet chew stick, the composition is consisting of: Rice flour (43.6%, classified as plant ingredient), fresh chicken breast (18%, classified as meat ingredient), ground pizzle (12%, classified as pizzle ingredient), vegetable glycerin (8%), gelatin (7%), chicken cartilage (2% classified as meat ingredient), cellulose powder (2%, classified as plant ingredient), calcium carbonate (2%), sweet potato (2%, classified as plant ingredient), lecithin (1%), carrageenan gun (1%), brewers yeast (1%), titanium dioxide (0.4%). In this formula, pizzle ingredient occupies 12% in the formula, plant ingredient totally 47.6%, and meat totally 20%. Vegetable glycerin, calcium carbonate and carrageenan gun are some chemicals.

As another formula embodiment to form the composition to produce the Artificial Bully Stick (or Bully-Stick-LIKE) pet chew stick, the composition is consisting of: Fresh chicken breast (28.00%, classified as meat ingredient), tapioca starch (20.00%, classified as plant ingredient), ground pizzle (12.00%, classified as pizzle ingredient), gelatin (12.00%), vegetable glycerin (8.00%), rawhide (5.00%), sorbitol (3.60%), cellulose powder (3.00%, classified as plant ingredient), calcium carbonate (3.00%), sweet potato (2.00%, classified as plant ingredient), lecithin (1.00%), carrageenan gum (1.00%), brewers yeast (1.00%), titanium dioxide (0.40%). In this formula, pizzle ingredient occupies 12% in the formula, meat 28% and plant ingredient totally 25%. Vegetable glycerin, sorbitol, calcium carbonate and carrageenan gun are some chemicals.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An edible pet chew, comprising:
   an extruded Artificial-Bully-Stick member imitating traditional dehydrated bully stick product, wherein said Artificial-Bully-Stick member is in a form imitating the appearance of traditional dehydrated bully stick product, wherein said Artificial-Bully-Stick member has a longitudinal groove part in its body longitudinally along said Artificial-Bully-Stick member body, wherein said Artificial-Bully-Stick member is formed from a composition material, wherein said composition material comprises a plant ingredient and at least 3% pizzle ingredient as formulated basis in the formula by weight, wherein said Artificial-Bully-Stick member further comprises an outer layer and an inner member, wherein said outer layer surrounds said inner member, wherein thickness of said outer layer is homogenous, said Artificial-Bully-Stick member is formed by co-extruding process, and wherein said inner member is comparatively looser in texture than said outer layer, wherein said inner member has small holes spread substantially homogeneously to said inner member body.

2. An edible pet chew, as recited in claim 1, wherein said composition material is free of collagen.

3. An edible pet chew, as recited in claim 2, wherein cross section of said Artificial-Bully-Stick member is with an outline shape substantially similar to letter "B", or peanut, or Arabic numerals "8" imitating traditional bully stick product.

4. An edible pet chew, as recited in claim 1, wherein said composition material comprises 3%-50% pizzle ingredient on an as formulated basis in the formula by weight.

5. An edible pet chew, as recited in claim 1, wherein said composition material comprises 10%-25% pizzle ingredient on an as formulated basis in the formula by weight.

6. An edible pet chew, as recited in claim 1, wherein said composition material further comprises 20%-95% plant ingredient on an as formulated basis in the formula by weight.

7. An edible pet chew, as recited in claim 1, wherein said composition material further comprises 20%-50% plant ingredient on an as formulated basis in the formula by weight.

8. An edible pet chew, as recited in claim 6, wherein said plant ingredient is an ingredient selected from the group consisting of: vegetables, fruit, edible-plant-derived materials, vegetable-derived materials, fruit-derived materials, plant protein, vegetable protein, plant starch, vegetable starch, grains, cereals, corn, gluten-free edible plant and gluten-free vegetables.

9. An edible pet chew, as recited in claim 7, wherein said composition material further comprises 10%-50% meat or meat by-product ingredient on an as formulated basis in the formula by weight and a chemical.

10. An edible pet chew, as recited in claim 1, wherein said composition material further comprises 10%-50% meat or meat by-product ingredient on an as formulated basis in the formula by weight and a chemical;

wherein said meat ingredient is selected from the group consisting of: animal flesh, animal muscle, poultry meat, chicken, chicken breast, duck, goose, turkey, venison, porcine meat, pork, bovine meat, beef, mutton, lamb, goat meat, fish, meat meal, chicken meal, fish meal, meat derived ingredient and poultry derived ingredient;

wherein said meat by-product ingredient is selected from the group consisting of: porcine meat by-product, poultry by-product, bovine meat by-product, animal viscera, animal stomach, animal tongue, animal kidney, animal blood, animal bone, partially defatted low temperature fatty tissue, animal intestines, animal spleen, animal liver, animal lung, animal heart, animal pizzle, meat by-product meal, poultry by-product meal, meat by-product derived ingredient, poultry by-product derived ingredient, animal fat and animal oil.

11. An edible pet chew, as recited in claim 6, wherein said edible pet chew further comprises an edible material member, wherein said Artificial-Bully-Stick member and said edible material member are assembled together to form a final product.

12. An edible pet chew, as recited in claim 11, wherein said edible material member is an animal hide material.

13. An edible pet chew, as recited in claim 1, wherein said composition material further comprises a pizzle flavor ingredient.

* * * * *